US008666373B2

(12) United States Patent
Dessouky et al.

(10) Patent No.: US 8,666,373 B2
(45) Date of Patent: *Mar. 4, 2014

(54) SYSTEM AND METHOD FOR DETERMINING A ZONE OF RELEVANCE FOR SUBSCRIBER LOCATION AND NOTIFICATION

(75) Inventors: Khaled I. Dessouky, Studio City, CA (US); Mario Proietti, Fullerton, CA (US); Brenda C. Schafer, Carlsbad, CA (US)

(73) Assignee: Technocom Corporation, Carlsbad, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/338,796

(22) Filed: Dec. 28, 2011

(65) Prior Publication Data
US 2013/0172013 A1 Jul. 4, 2013

(51) Int. Cl.
*H04M 3/42* (2006.01)
(52) U.S. Cl.
USPC .................. 455/414.1; 455/414.2; 455/456.3; 709/219

(58) Field of Classification Search
USPC ................................. 455/414.1, 414.2, 456.3
See application file for complete search history.

(56) References Cited

U.S. PATENT DOCUMENTS

| 7,164,986 | B2 | 1/2007 | Humphries et al. |
| 7,254,388 | B2 | 8/2007 | Nam et al. |
| 7,848,765 | B2 | 12/2010 | Phillips et al. |
| 7,870,229 | B2 | 1/2011 | Spector |
| 8,019,532 | B2 | 9/2011 | Sheha et al. |

*Primary Examiner* — Charles Shedrick
(74) *Attorney, Agent, or Firm* — Christie, Parker & Hale, LLP (57) ABSTRACT

A computer-implemented method for determining a zone of relevance for locating wireless subscribers of interest to a location based application and making a user notification decision including: obtaining application specific information from an application service provider; obtaining wireless subscriber profile and real time information from a serving wireless network operator; accessing a geographical database to extract related geographic information; extracting relevant dynamic inputs from external sources; determining the value of user notification based on weighting of said extracted information and historical use information; and determining a corresponding zone of relevance wherein notifying the user meets certain criteria for the determined value of notification.

20 Claims, 8 Drawing Sheets

Fig. 8

US 8,666,373 B2

SYSTEM AND METHOD FOR DETERMINING A ZONE OF RELEVANCE FOR SUBSCRIBER LOCATION AND NOTIFICATION

RELATED APPLICATIONS

The present application is related to co-pending U.S. patent application Ser. No. 13/314,941, filed Dec. 8, 2011, and assigned to the same assignee.

FIELD OF INVENTION

The present invention relates generally to the field of mobile wireless communication, more particularly to a method and system for determining a zone of relevance for a mobile subscriber where location determination and notification meet certain value criteria.

BACKGROUND

With the proliferation of Global Positioning System (GPS) devices in commercial applications over the last decade and a half, various methods to leverage the positioning capability in mobile devices to perform geographically-based functions have emerged. For example, U.S. Pat. No. 7,164,986 discloses a method and system to track devices and ensure their route adherence via geofencing. With the proliferation of location capabilities in wireless networks and handsets, methods have also emerged to extend such geographic locating capabilities to cellular devices and leverage information that may exist in the wireless network. U.S. Pat. No. 7,254,388 discloses a system for mobile station-assisted triggers and service methods wherein a location assistant on the handset (e.g., a module and application) plays an assisting role in simplifying and making more efficient the task of identifying whether the mobile device approached, entered or exited a certain geographical zone, consequently triggering certain actions. Further U.S. Pat. Nos. 7,848,765 and 7,870,229 have extended these concepts for location-based services (LBS), such as for the support of location-based advertising or geographic zone-based services. U.S. Pat. No. 8,019,532 focuses on defining a specific boundary (e.g., a polygon or shape) about a point of interest (POI) on a map for the purposes of offering services to a mobile device, in particular a smartphone with location determination capabilities and the ability to save such contours for the purposes of acting upon them.

Common to the above-mentioned inventions is the important role played by the mobile device in actively defining the geographical boundary and in leveraging the device's intelligence in reducing the amount of required communication and location determination transactions. Those transactions are required to support and operate the intended application, such as geographically-based services or alerts.

The potential lack of mobile device sophistication (e.g., no Smartphone, no GPS, or GPS not enabled) or desire for active participation (e.g., via downloading a location-based application to the handset) implies an increased need for location platform intelligence and actions to communicate with and to locate the mobile device. This also implies an increased interaction with the wireless network. Whether it is a call or a data session for communication or a "location dip" to locate the subscriber, these transactions have an associated cost to the application service provider, wireless carrier and possibly the end user of the application, especially if they need to be done liberally or repeatedly. They can easily reduce the business value of the service or feature offered by the service provider.

The management and optimization of these underlying transactions is critical when the subject location based service is implemented with almost exclusive reliance on the server side capability, with minimal participation from or reliance on the mobile device, as envisioned in various embodiments of the present invention.

SUMMARY

In some embodiments, the present invention is a computer-implemented method for determining a zone of relevance for locating a wireless subscriber and making a user notification decision. The method includes: obtaining application specific information from an application service provider; extracting geographic information from a geographical database based on information obtained from the application; obtaining subscriber profile and real time information related to said subscriber from a serving wireless network; retrieving information related to said subscriber's preferences related to said application from an auxiliary subscriber database; extracting relevant dynamic inputs from external sources over a predefined application programming interface; determining a value of the user notification based on weighting of said obtained and extracted information combined with historical use information; determining a zone of relevance for the wireless subscriber based on comparing a notification value-cost ratio to a threshold value; and notifying a user, based on predetermined criteria for a determined value of notification.

In some embodiments, the present invention is a computer-implemented method for deciding whether and how to notify a user. The method includes: determining that a wireless subscriber is within a zone of relevance; determining applicable notification methods based on application-specific information obtained from an application service provider, wireless subscriber profile information and real time information obtained from a wireless network, and information from a geographic database; determining the costs of said applicable notification methods; performing a value-cost comparison by comparing the notification value-cost ratio to a predetermined threshold; making a decision to notify the user based on the value-cost comparison; selecting a notification method with highest value to cost ratio; and using the selected notification method to notify the user.

In some embodiments, the present invention is a computer-implemented method for deciding whether and how to locate a mobile subscriber. The method includes: determining applicable location determination methods within a zone of relevance based on application specific information obtained from an application service provider, information from a wireless network serving the subscriber, and information extracted from a geographic database; determining applicable notification methods within the zone of relevance; determining costs associated with the applicable location determination and notification methods; performing a notification value-cost comparison by comparing a notification value-cost ratio to a threshold; making a user notification decision; and determining a location determination quality and update requirement for the mobile subscriber commensurate with the decision whether to notify or not notify a user.

DETAILED DESCRIPTION

The present invention addresses, among other uses, the case where the subscriber's mobile device may not have a location module, a location application, or ample processing power and yet a mobile application service provider that desires to provide location-relevant services to such subscriber, can still achieve its objectives in an optimized, cost effective manner. In this context, the present invention, which may reside on a location platform operated by a location service provider, creates an added value to the mobile application service provider and the wireless service provider. The invention acts as an agent that leverages the information within the wireless network or that which is held by the wireless service provider, combines the information with data from various external sources, as well as data generated and stored internally, to feed logical processes that achieve the desired levels of efficiency in locating and communicating with the target subscriber.

Not relying on the mobile device capability allows the application service provider a much wider reach to potential subscribers and end-users. In addition, it alleviates the heavy processing burden from the mobile device, which can cause significant battery drain. Furthermore, leveraging the information about the subscriber within the wireless network ensures the currency, quality and accuracy of the subscriber data used.

Figure 1:
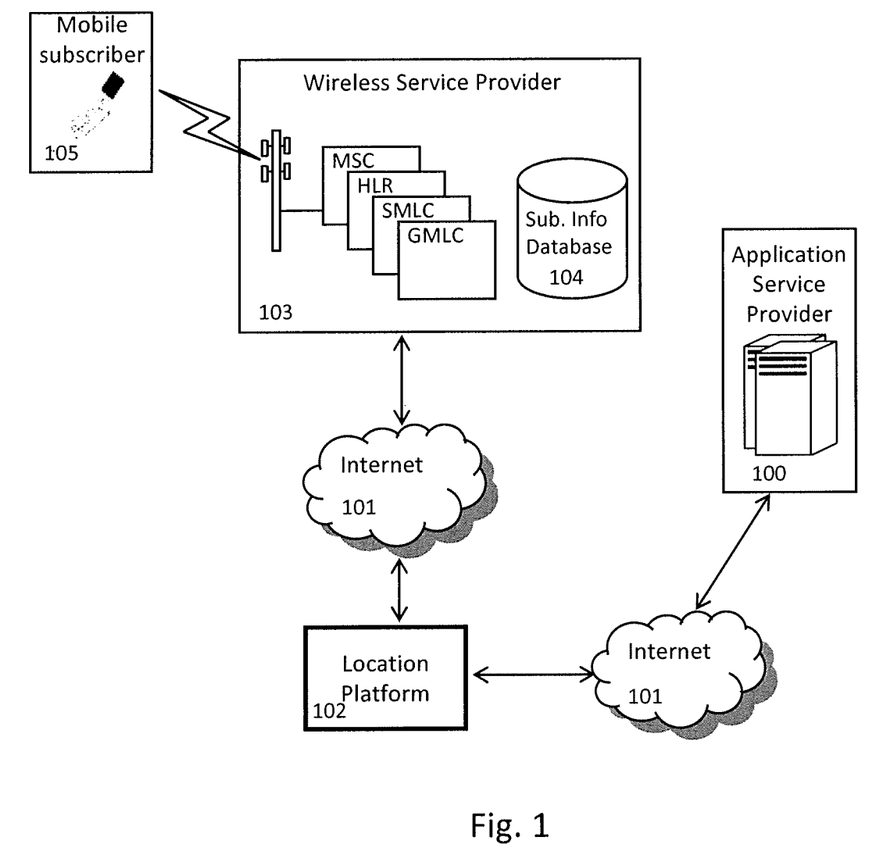
FIG. 1 shows an illustrative block diagram of a wireless system offering location based services, according to some embodiments of the present invention.

FIG. 1 illustrates an exemplary block diagram of a system offering location based services according to some embodiments of the present invention. In the illustrated example, a mobile application service provider (100) utilizes the location platform (102) and the location service provider operating that platform to optimize the connectivity and targeted communication to a mobile end user (105). The end user is a subscriber of a wireless service provider (103), e.g., a subscriber of a wireless carrier. Wireless communication to such a subscriber is via the wireless infrastructure of the network, which contains the usual components such as those commonly found in a cellular network, including a Mobile Switching Center (MSC) involved in routing calls to the mobile subscriber, a Home Location Register holding information about the subscriber and its subscription, and location determination related elements such as a Serving Mobile Location Center (SMLC) and a Gateway Mobile Location Center (GMLC), or equivalent entities. The location platform, in performing its functions, leverages the information within the wireless network or which is held by the wireless service provider to achieve the desired levels of efficiency in locating the subscriber and communicating with it. As illustrated in FIG. 1, in some embodiments, the information about the subscriber could be aggregated in a subscriber database (104) within the wireless network.

The mobile application service provider could be an information aggregator, a web services portal, a provider or user of mobile marketing (mobile vouchers, mobile coupons, loyalty cards, etc.), an application provider for workforce management, asset tracking or transportation management, or an application provider for a host of other mobile subscriber services, such as personal alerting, social networks, or mobile discovery. The end user (105) could be a member of a group belonging to, affiliated with, or subscribing to an application service provider (100), a marketing target of a commercial enterprise (e.g., a chain store, a company with a loyalty program), or a wireless subscriber who is an occasional user of certain mobile applications that utilizes location information.)

Connectivity between the application service provider and the location platform, and between the location platform and wireless network is via the Internet. However, dedicated connectivity for large application service providers or wireless carriers with considerable application related traffic is also possible. Connectivity is via an established protocol over a well-defined Application Programming Interface (API) agreed upon between the location platform and the application service provider, or between the location platform and the wireless service provider/network operator. A web services API utilizing Extensible Markup Language (XML) is one common interface. It is also possible, albeit not shown in the figure, that notification can be made to a $3^{rd}$ party different from the mobile subscriber to be located. Examples of such $3^{rd}$ parties could be the application service provider, an affiliated enterprise or a customer of it, or an interested individual such as a parent (e.g., in a family/friend finder or social networking application). Such notification can take place via a wired or a wireless network.

For maximum utility and value to the application service provider in this context, the target mobile device may contain sophisticated location capabilities, such as a GPS module, or features common to so-called smartphones, like powerful processing, advanced operating system, location based applications, or a sizeable screen. If the device contains such capabilities, its user may not be a sophisticated user or be a willing participant in downloading application software or even turning on a GPS-type location capability. The present invention is particularly suited to handling mobile devices with limited capabilities available or enabled by optimizing the location determination and notification process on the location server side. Such mobile devices often present the most challenges to the location service provider from a cost perspective, since their intelligence is not utilized in assessing their presence relative to a geographical zone of interest. This could lead to repeated attempts at determining subscriber location and communicating with it, resulting in rapidly increasing costs.

The present invention is also well suited to application providers who cannot afford large up-front investments to deploy, maintain and market handset applications or need to have a broader reach beyond handsets with deployed applications.

Figure 2:
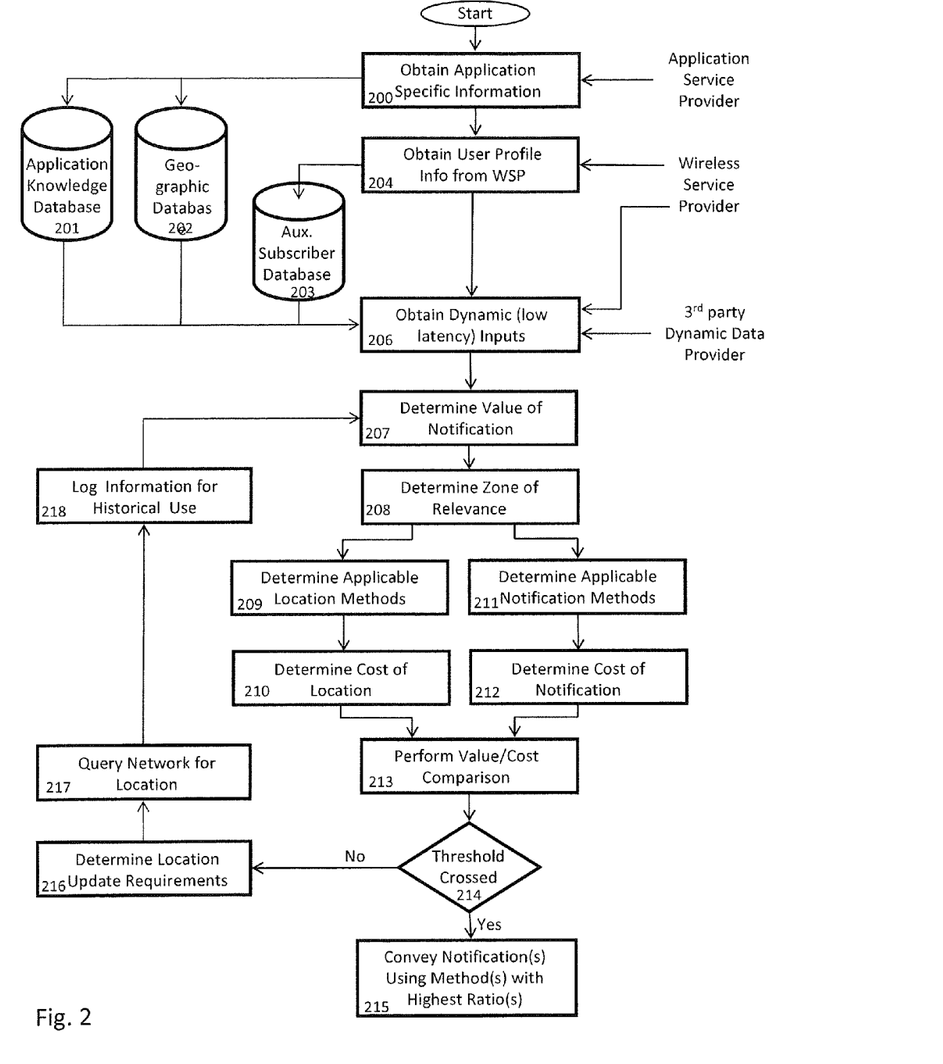
FIG. 2 shows a logical flow diagram pertaining to zone of relevance determination and action, according to some embodiments of the present invention.

FIG. 2 shows an exemplary flow diagram of the processes, for example, within the location platform (102) pertaining to determining and acting upon a zone of relevance for the targeted mobile subscriber. The processing in the flow is triggered by one of multiple events. In some embodiments, a request is received from an application service provider to perform a location based transaction such as locate one or more users of a certain type in a specified area, possibly to push information, issue a specific alert or advisory, effect a dispatch or group management operation, or authenticate a transaction.

In some embodiments, inputs to the process are first aggregated, including gathering application specific information (200) from an application knowledge database (201), and geographic information from a geographic database (202). The received application specific information, optionally together with the locally stored application information (201) and geographic information (202), is used to synthesize an information request about the wireless subscriber, which is relayed to the wireless service provider (typically the wireless network operator of which the mobile user is a subscriber). This information includes information pertaining to the subscriber's settings and presence in the wireless network. Additionally, information pertaining to the subscriber's interaction with the application is stored locally (on the location platform [102]) in an auxiliary subscriber database (203).

Figure 3:
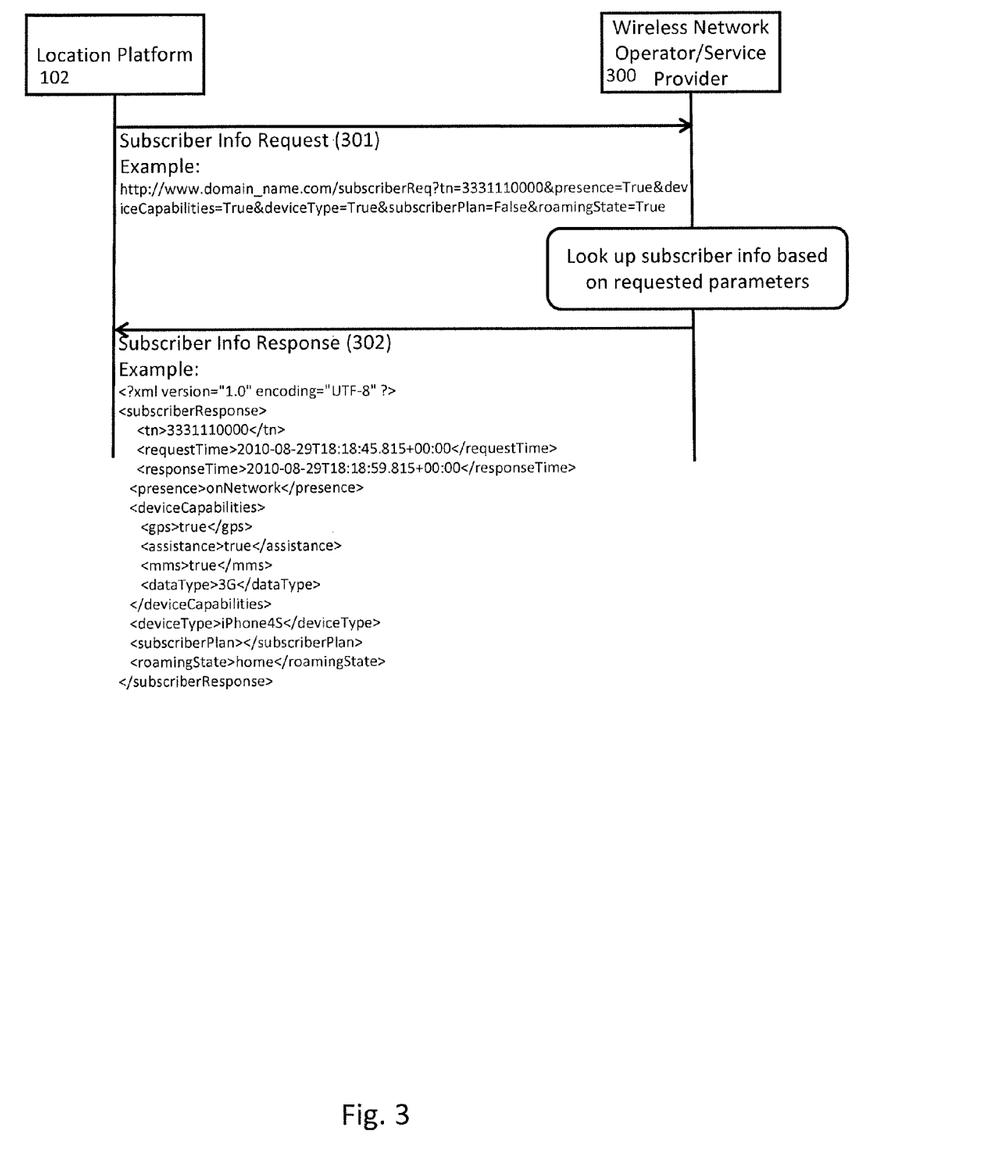
FIG. 3 shows an exemplary data flow to obtain subscriber information from a wireless network operator or service provider, according to some embodiments of the present invention.

FIG. 3 depicts an illustrative embodiment of the interface between the location platform (102) and the wireless network operator (300) for the purpose of obtaining the desired subscriber information. In some embodiments, the request for subscriber information (301) from the wireless operator includes subscriber profile type information and real time information. Such real time or dynamic information includes the presence of the subscriber on the network or a certain part thereof, the current status of the subscriber (e.g., roaming), and the enabled subscriber services (e.g., voice, Short Message Service (SMS), data, etc.). The subscriber profile type of information includes the privacy and consent settings agreed to by the subscriber (e.g., one time versus persistent consent required), the subscriber's mobile device type, capabilities known by the network operator to be available on that device (e.g., 3G/4G, GPS, WiFi), as well as, relevant subscriber billing information. A corresponding exemplary response from the wireless network using XML is also depicted in FIG. 3 (302).

The information obtained from the internal databases (201, 202, 203) and from the wireless service provider (204) is used to assess the need for other relevant dynamic inputs, such as real time or low latency information from third parties. Such parties could be affiliated with the application service provider, an information aggregator or web services portal, a weather service, a traffic service, a fraud detection service or the like.

Figure 4:
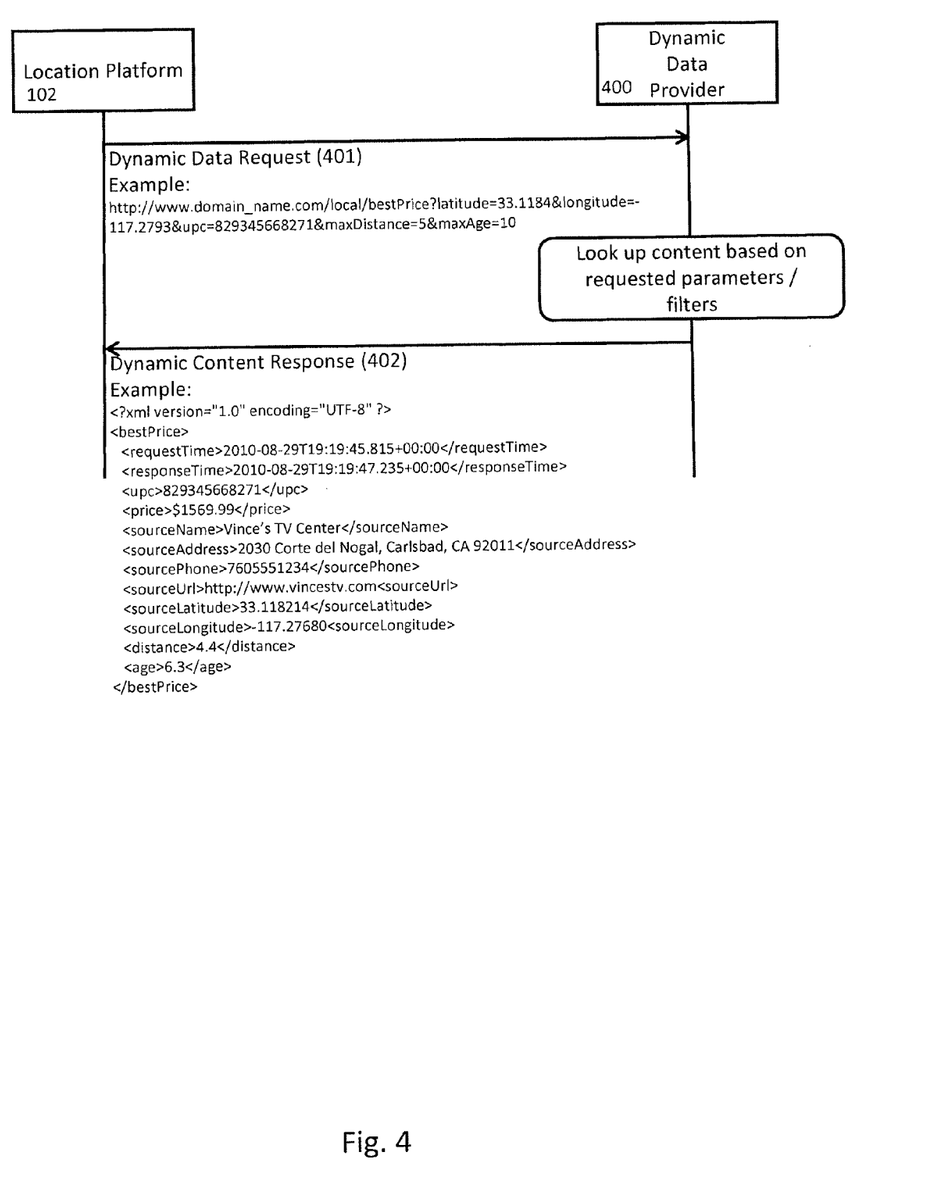
FIG. 4 shows an exemplary data flow to obtain dynamic (low latency) inputs from a third party dynamic data provider, according to some embodiments of the present invention.

FIG. 4 shows an exemplary data flow to obtain dynamic (low latency) inputs from a third party, according to some embodiments of the present invention. The sources of such low latency information could be: (i) an entity affiliated with the application service provider (e.g., inventory status of a certain product in a certain area); (ii) an information aggregator (product prices in a certain area, such as groceries, cars, electronic items, air fares, last minute special deals); (iii) a third party, like a weather service, a traffic service, or a local authority issuing time-relevant information, among others.

In the embodiments depicted in FIG. 4, a request for dynamic data (401) from the location platform (102) to the dynamic data provider (400) and its corresponding response (402), use a Web services API with an XML response. In this illustrative example, the request (401) is to obtain real time prices for a certain electronic item in a certain area about a set of geographic coordinates. The "UPC" in the information request (401) and response (402) refer to the specific product for which information is sought, e.g., some TV model. Such an information request could be in support of a retail application wherein a company wishes to notify its nearby consumers of the cheapest electronics prices available in a certain geographic vicinity. Some of the possible content filters or query parameters, as illustrated in (401), include: content type, criterion, desired location, maximum distance, maximum information age, minimum validity period, etc. The exemplary response (402) contains a list of identified retailers, their addresses, electronic item prices, and information aging parameters.

Figure 5:
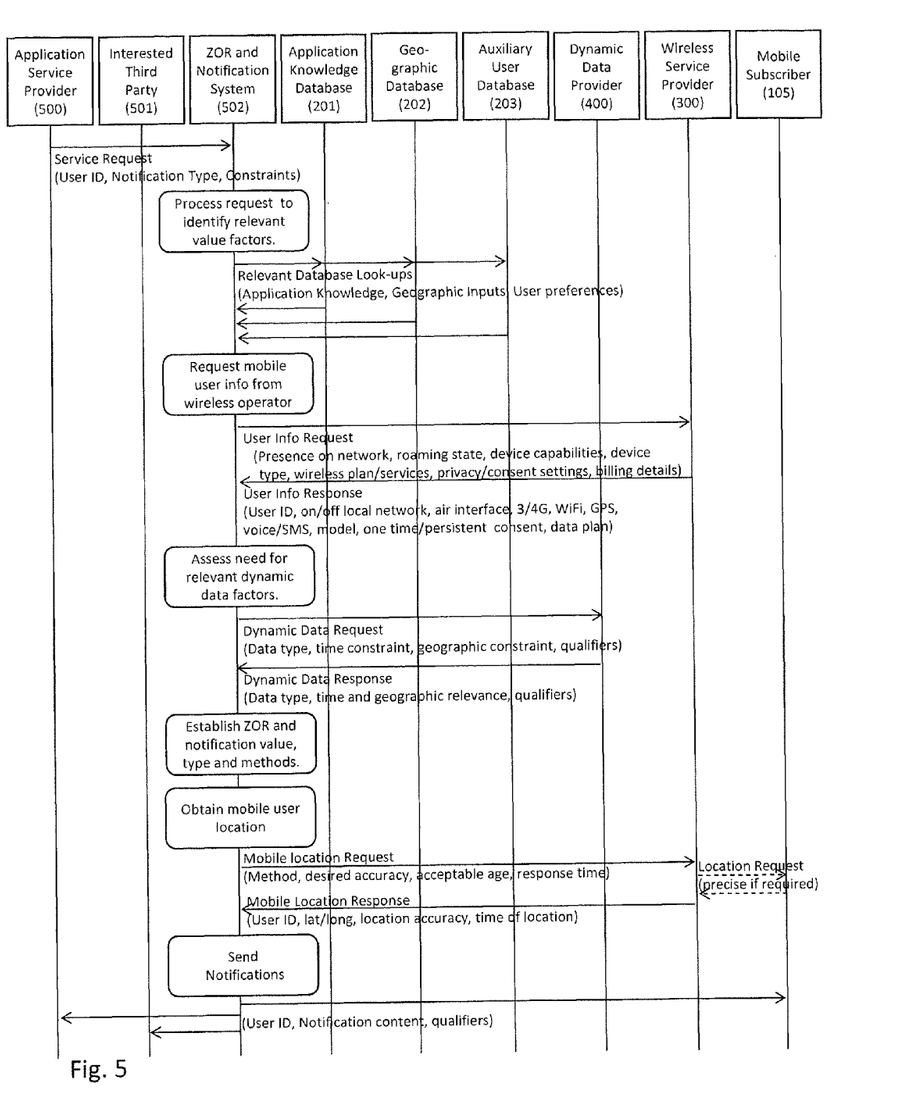
FIG. 5 shows an exemplary sequence of events, according to some embodiments of the present invention.

FIG. 5 shows a sequence of events in some embodiments of the present invention leading to the information requests to the wireless service provider and third party dynamic information providers. As shown, the Zone of Relevance (ZOR) and Notification System (502) refers to the realization, such as in the form of computer instructions, which implements the logical flow shown in FIG. 2. A service request is received from the application service provider (500), which is then processed to identify the relevant information required from the local databases (201, 202, 203), the information to be requested from the wireless operator (300), and the dynamic or other low latency information to be requested from one or more third party dynamic data providers (400).

Figure 6:
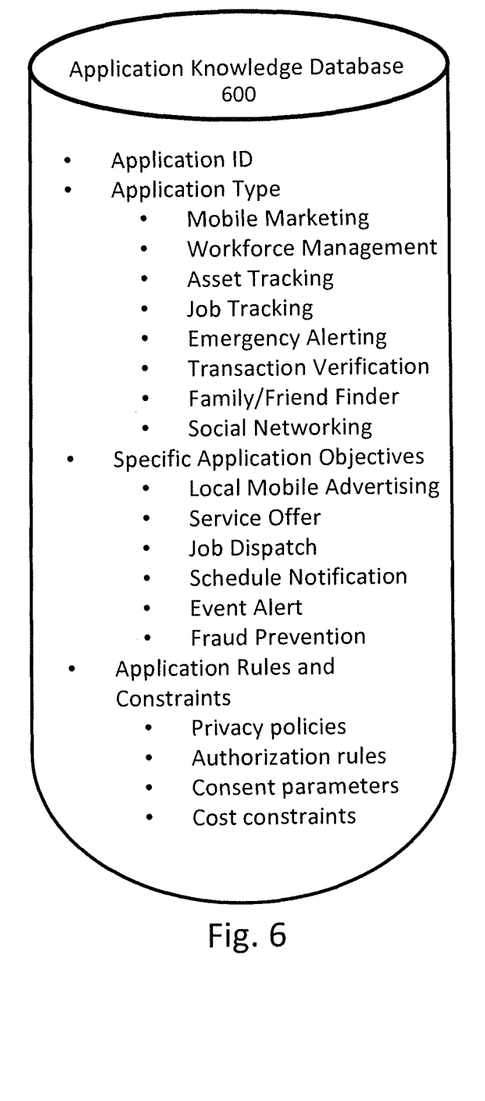
FIG. 6 shows an exemplary content of an application knowledge database, according to some embodiments of the present invention.

FIG. 6 depicts in more detail some embodiments of the information pertaining to the applications and application service providers stored locally in the Application Knowledge Database. This database contains data fields that identify the application and application service provider, the application type (e.g., mobile marketing, workforce management, asset tracking, transaction verification, alerting, family finder, etc.), the application's specific objectives (e.g., area advertising, offer promotion, fleet members notification, personal alerting), along with rules and constraints imposed on the application by the application service provider or other entities, such as cost parameters, information latency requirements, privacy and subscriber consent rules.

Figure 7:
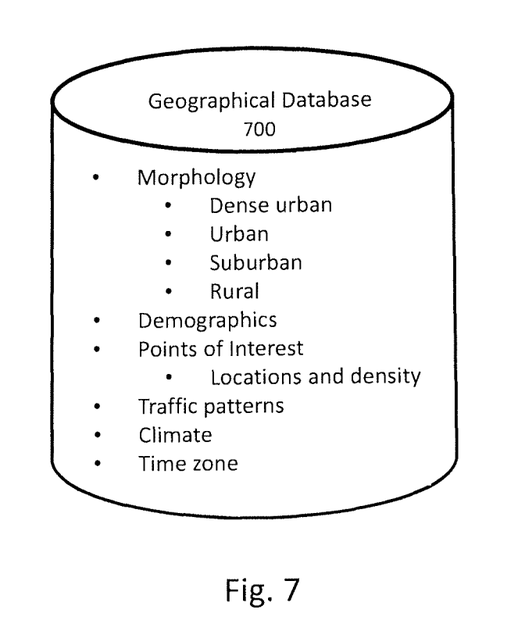
FIG. 7 shows an exemplary content of a geographical database, according to some embodiments of the present invention

FIG. 7 illustrates the contents of an exemplary geographical database (700), according to one embodiment of the present invention. Information obtained from the application service provider is used to key on geographic attributes that will subsequently influence the parameters of the zone of relevance and the communication and location determination costs associated with it. Information in this database includes morphology or land use in the general target area (urban, suburban, etc.), location and density of certain points of interest to the application (e.g., store outlets, preferred service facilities, spots of population aggregation), established traffic patterns and rush hours, along with general climate data (zones of relevance may become smaller in a frigid climate for example), and the like.

Figure 8:
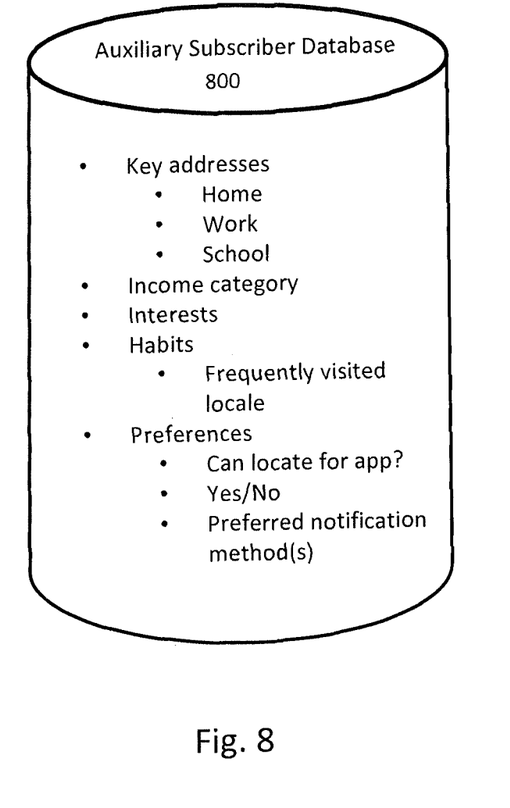
FIG. 8 shows an exemplary content of an auxiliary subscriber database, according to some embodiments of the present invention

In addition to information about the subscriber that is obtained from the wireless service provider, information related to how this mobile user interacts with or is likely to interact with the application is stored locally in an auxiliary subscriber database illustrated in more detail in FIG. 8, according to one embodiment of the present invention. In some cases, the database (800) contains key subscriber addresses (e.g., home, work, school addresses), habits (e.g., stop for shopping along the way from work to home), income category, previous response to similar location based services, and preferences in using the application, like preferred offers and notification methods. In some embodiments, such as in a workforce management application, information about the capability of the mobile user (e.g., type of vehicle, type of fuel used), may be stored along with the task and route and schedule normally assigned to that user.

The information obtained from the local databases 201/600, 202/700, and 203/800, and the wireless service provider via (301/302) is sufficient for the logic in block 502 to bound the area of interest to the application and the general area where the mobile user is, without the need to perform an actual "location dip" that is, without a request to the wireless network to determine the actual or precise location of that subscriber. Such a location transaction entails cost that may not be warranted if notifying or tracking the subscriber relative to a certain zone is determined to be unnecessary. This information is also sufficient to formulate a request for dynamic or low latency information that maybe required from a third party.

Referring back to FIG. 2, the logic in Determine Value of Notification (207) entails an assignment of individual values to the information obtained from: (i) the application provider (200); (ii) the internal application knowledge database (201); (iii) the geographic database (202), (iv) the wireless operator (204); (v) the supplementary subscriber database related to its application use (203); (vi) the dynamic or low latency external inputs (206); and the historical information (218). In one embodiment a weighted average of these values is determined to render a value for the notification; i.e., a value for attempting to reach and locate the mobile subscriber, both actions entailing expending resources, including direct costs.

By way of example, for an application concerned with marketing or advertising of certain merchant offers, the value of notification would be higher if the subscriber has a profile that matches a likely purchaser based on: (i) history of utilization, (ii) their habits and preferences in their profile; (iii) the points of interest for the merchant (e.g., it's stores) likely to be along the mobile subscriber's path during a certain time window (e.g., their typical window for commute from work to home). On the other hand, the value of notification for the merchant would be lower, if the subscriber is outside the zone of relevance or is not providing consent for it to be located, per its profile.

By way of another example, the value of notification for a dispatch application utilized for roadside assistance would be higher if one or more end-users are based, per their profile, close to an impending event (e.g., tow trucks with home bases within reach of a freezing rain event). In yet another example, in an asset management application, the value of notification may be directly related to the value of the cargo or asset. Such value would be obtained from the entity running that application (i.e., the application provider) or from a dynamic input. In a corresponding example in a banking and fraud mitigation application, the value of notification would rise with the value of the high risk financial transaction, which is determined based on a dynamic input, possibly from an authorized fraud detection bureau (a designated $3^{rd}$ party).

Determine Zone of Relevance (208) entails a determination of how wide (e.g., city, county, several miles on highway) or how narrow (e.g., few city blocks, campus boundary) the area where reaching the target end user is of significant value to the application. This varies with the nature of the application, it's cost constraints (in 201 or 600), geographical factors (in 202 or 700) such as area type (e.g., urban), points of interest and their density (e.g., stores, outlets), time zone and traffic patterns, and the wireless network (300) regarding the subscriber (per 301/302). This information is combined with historical information and utilized in the zone of relevance determination. Also used in the zone of relevance determination is information about the end-user regarding its location and notification preferences.

With the establishment of a quantitative value for end-user notification and a specific zone where such notification is applicable, the available and applicable options to locate and notify the end user and their associated costs are determined.

In a location based services context where the information about user location is obtained from the wireless carrier serving the end user, several forms of location determination may be available and often bear different costs. The wireless carrier's network may be a Code Division Multiple Access (CDMA), Global System for Mobile Communications (GSM), Universal Mobile Telecommunications System (UMTS), 3GPP Long Term Evolution (LTE) or other network. A coarse location could be a cell ID type of information. A medium accuracy location could be an enhanced cell ID, possibly utilizing a network ranging measurement or other network based location determination, such as trilateration, or a proximity-based location (e.g., using WiFi). A high accuracy or precise location could be a handset-based or handset assisted GPS location or could be a physical or Internet address, depending on the application. Pricing arrangements between a location service provider utilizing the present invention and different wireless carriers result in different costs for the different types of location fixes, typically the more precise the location the more expensive the location dip.

The present invention optimizes the process of reaching the mobile user and its associated costs. In addition, the invention tailors the location determination and notification to the needs of the location based application and takes into account available network and subscriber capabilities and preferences. Both the wireless network and the mobile device may be able to accommodate or support different location methods as described above. Additionally, some users of certain applications may have preferences that impact what is applicable. For example, a subscriber may select not to be located precisely or an application may specify the type of location accuracy required.

In Determine Applicable Location Methods (209), based on the determined zone of relevance, the value of the notification, inputs from the wireless operator (e.g., location methods currently available for use with the subscriber), and additional information in the auxiliary subscriber database regarding its location determination preferences and mobile device capability, a determination is made of the available and applicable modes of location. Examples are coarse versus precise location, and network versus handset location. A determination is also made of the location latency requirements corresponding to the application (e.g., location must be real time, could be cached from the previous session, or from an older historical record until a higher notification value is established in the future). Costs associated with the applicable location transaction types are extracted from internal records and compiled in block 210.

In parallel with the determination of location requirements and its costs, in block 211 a determination is made of the applicable notification methods. Notification could be to the mobile subscriber, another mobile end-user, an application service provider, a commercial enterprise or its affiliate, or an interested third party (e.g., a parent or a friend finder participant). Applicable notification methods will depend on the identified party to receive the notification and their profile and device capabilities. These methods could be a voice call, a text message, a Multimedia Messaging Service (MMS) message, an e-mail, or even a binary command (a programmatic instruction via internet protocol to a wired or mobile computer application or a Wireless Application Protocol (WAP) push). These clearly have different suitability, effectiveness and time criticality in reaching the mobile user or desired 3$^{rd}$ party to be notified. For example, an e-mail would not be suitable to reach a basic feature flip phone in a timely manner. Other modes of communication may not be supported by the subscriber equipment either.

Key pieces of information extracted from prior steps in the process are utilized by the Determine Applicable Notification Methods logic in block 211. In some embodiments, information gleaned from the wireless operator about the subscriber, e.g., mobile device capability and roaming state, from the auxiliary subscriber database, e.g., preferred notification methods, and application specific information (e.g., pricing), are combined with the determined zone of relevance in the cost computation. The size of the zone of relevance is important since there may be potentially many users to reach in a larger zone. The costs for the applicable notification methods are computed in block 212.

Whereas the above steps are shown in FIG. 2 as being in parallel, occurring after a sequential set of steps, the exact sequence or order of steps could be different without altering the nature of the invention.

A comparison of the value of notification to the determined costs of location and notification is performed in block 213. In block 214, one or more values and costs may be part of the comparison and one or more thresholds may be employed simultaneously, to support differentiated notifications, even to users of the same application in response to the same triggering event that launches the overall process in FIG. 2. It is possible, for example, to decide to notify a small group of end-users who are more geographically proximate to a point of interest using a text message while notifying a wider group using a lower cost, a higher latency e-mail method.

With the applicable location determination methods identified in block 209, their associated costs determined in block 210, and the decision to notify or not notify the end user made, the location update requirement is set in block 216. It may be necessary to locate the subscriber coarsely then precisely, or precisely more than once, or just coarsely, or not at all; and use rough information from a previous location attempt (a historic or a cached location). The serving wireless network is queried for location per these requirements in block 217, and the location result is logged. The logged location and notification decision are used in subsequent iterations of Determine Value of Notification and as a historical record for future reference and pattern identification, in block 218.

The process illustrated in FIG. 2 is then repeated as needed. The entire process may be repeated, or only parts of it is repeated if some longer term information, e.g., from the databases has not changed. For example, an iteration of the flow may be applied to only adjust the value of notification and the zone of relevance based on updated information from the wireless operator. In another example, partial iteration of the flow may be performed in response to an update of a recently identified cost parameter associated with an earlier decision to notify or not notify the end-user.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer-implemented method for determining a zone of relevance for locating a wireless subscriber and making a user notification decision, the method comprising:
    obtaining application specific information from an application service provider;
    extracting geographic information from a geographical database based on information obtained from the application;
    obtaining subscriber profile and real time information related to said subscriber from a serving wireless network;
    retrieving information related to said subscriber's preferences related to said application from an auxiliary subscriber database;
    extracting relevant dynamic inputs from external sources over a predefined application programming interface;
    determining a value of the user notification based on weighting of said obtained and extracted information combined with historical use information;
    determining a zone of relevance for the wireless subscriber based on comparing a notification value-cost ratio to a threshold value; and
    notifying a user, based on predetermined criteria for a determined value of notification.

2. The method of claim 1, wherein the user to be notified is one or more of said wireless subscriber, an application service provider, an enterprise, an affiliate, a different mobile end-user, and an interested third party.

3. The method of claim 1, wherein the application is related to one or more of mobile marketing, workforce management, asset tracking, transportation management, emergency alerting, banking, fraud detection, social networking, and family or friend tracking.

4. The method of claim 1, wherein the geographic database comprises information about area morphology and density, demographics, points of interest to the application, traffic patterns, and climate.

5. The method of claim 1, wherein the subscriber information obtained from the wireless network comprises subscriber identification information, subscriber's presence on the network, subscriber's roaming status, its wireless device capabilities, wireless device type, wireless services to which it is subscribed to and able to use, and billing information.

6. The method of claim 1, wherein the dynamic inputs extracted from external sources comprise relevant information from one or more of a designated affiliate of the application service provider, an information aggregator, a web services portal, a weather service, a traffic service, and a third party with relevant information to the user to be notified.

7. The method of claim 1, wherein the auxiliary subscriber database contains the subscriber's key addresses, interests, habits, income category and preferences.

8. The method of claim 7, wherein the subscriber preferences comprise a chosen method to consent to being located, constraints on the location, and preferred notification methods.

9. A computer-implemented method for deciding whether and how to notify a user, the method comprising:
    determining that a wireless subscriber is within a zone of relevance;
    determining applicable notification methods based on application-specific information obtained from an application service provider, wireless subscriber profile information and real time information obtained from a wireless network, and information from a geographic database;

determining the costs of said applicable notification methods;

performing a value-cost comparison by comparing the notification value-cost ratio to a predetermined threshold;

making a decision to notify the user based on the value-cost comparison;

selecting a notification method with highest value to cost ratio; and using the selected notification method to notify the user.

10. The method of claim 9, wherein the user is one or more of said wireless subscriber, an application service provider, an enterprise, an affiliate, a different mobile end-user, and an interested third party.

11. The method of claim 9, wherein the information obtained from the wireless network comprises subscriber identification information, presence of the subscriber on the network, the subscriber's roaming status, its wireless device capabilities, wireless services to which it is subscribed to and able to use, and billing information.

12. The method of claim 9, wherein the wireless network is one or more of Code Division Multiple Access (CDMA), Global System for Mobile Communications (GSM), Universal Mobile Telecommunications System (UMTS), 3GPP Long Term Evolution (LTE) networks, and wherein available wireless location methods are one or more of cell ID, enhanced cell ID, signal strength, WiFi proximity, network based triangulation, standalone GPS, and assisted GPS.

13. The method of claim 9, wherein multiple thresholds are used simultaneously to decide about delivery of differentiated types of notifications to users of the same application and for the same triggering event.

14. The method of claim 9, wherein the notification is to multiple users of the same application via multiple notification methods, depending on determined costs and applicability to said users.

15. A computer-implemented method for deciding whether and how to locate a mobile subscriber, the method comprising:

determining applicable location determination methods within a zone of relevance based on application specific information obtained from an application service provider, information from a wireless network serving the subscriber, and information extracted from a geographic database;

determining applicable notification methods within the zone of relevance;

determining costs associated with the applicable location determination and notification methods;

performing a notification value-cost comparison by comparing a notification value-cost ratio to a threshold;

making a user notification decision; and determining a location determination quality and update requirement for the mobile subscriber commensurate with the decision whether to notify or not notify a user.

16. The method of claim 15, wherein the mobile subscriber to be located is different from the user.

17. The method of claim 15, wherein the applicable mobile subscriber location methods comprise one or more of cell ID, enhanced cell ID, signal strength, WiFi proximity, network based triangulation, standalone GPS, and assisted GPS.

18. The method of claim 15, wherein the applicable mobile subscriber location methods use real time location determination or cached location from a prior location attempt.

19. The method of claim 15, wherein the determined mobile subscriber location quality and update requirement results in corresponding querying of a serving wireless network and logging of returned location result for subsequent use.

20. The method of claim 15, wherein the logged location result for the mobile subscriber is fed back to update the determined location determination quality and update requirement and the zone of relevance.

* * * * *